United States Patent [19]

Manson et al.

[11] Patent Number: 5,495,722

[45] Date of Patent: Mar. 5, 1996

[54] REMOTE CONTROL FOR DIAGNOSTICS OF AN AIR CONDITIONER

[75] Inventors: Larry J. Manson, Baroda Township, Berrien County; John K. Paustian, Millburg; Patrick J. Glotzbach, Ann Arbor, all of Mich.

[73] Assignee: Whirlpool Corporation, Benton Harbor, Mich.

[21] Appl. No.: 230,963

[22] Filed: Apr. 21, 1994

[51] Int. Cl.⁶ .................................................. F25B 49/02
[52] U.S. Cl. .......................... 62/125; 62/127; 236/51; 236/94
[58] Field of Search .................. 62/125, 126, 127, 62/129, 130, 157, 158; 236/51, 94; 165/11.1; 340/825.16, 825.17, 825.36, 825.37

[56] References Cited

U.S. PATENT DOCUMENTS

| | | | |
|---|---|---|---|
| 4,146,085 | 3/1979 | Wills | 165/11 |
| 4,299,095 | 11/1981 | Cassarino | 62/158 X |
| 4,470,266 | 9/1984 | Briccetti | 62/126 |
| 5,113,665 | 5/1992 | Katsuki | 62/126 |
| 5,189,412 | 2/1993 | Mehta et al. | 340/825.22 |
| 5,272,477 | 12/1993 | Tashima et al. | 236/51 X |
| 5,321,229 | 6/1994 | Holling et al. | 340/825.17 |
| 5,326,027 | 7/1994 | Sulfstede | 236/94 X |
| 5,398,251 | 3/1995 | Shim | 62/127 X |

*Primary Examiner*—Harry B. Tanner
*Attorney, Agent, or Firm*—Baker & Daniels

[57] ABSTRACT

An apparatus for controlling operation of diagnostic test modes with a remote control for a room air conditioner. Program keys are selected and activated to allow a user to input a particular diagnostic test mode to the air conditioner. The user then monitors the actions of the room air conditioner to ensure that the room air conditioner successfully completes the selected diagnostic test. Two remote control units are utilized, one to operate the room air conditioner in a conventional way while a second remote unit transmits codes to cause the air conditioner to run a diagnostic test. The remote control units includes a microprocessor to accept and process the entered selections for the diagnostic tests.

9 Claims, 3 Drawing Sheets

Microfiche Appendix Included
(3 Microfiche, 135 Pages)

REMOTE CONTROL FOR DIAGNOSTICS OF AN AIR CONDITIONER

MICROFICHE APPENDIX

This application includes microfiche appendix having 135 frames which discloses the software resident in the memory of the remote control. The software includes routines which implement diagnostic and general operational functions. A portion of the disclosure of this patent document contains material which is the subject of copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention relates to the control of room air conditioner units, and more particularly, to a remote control system useful in diagnosing problems with an air conditioning unit.

Room air conditioning units provide an alternative to central air conditioning systems in apartment buildings, offices and homes where it is either impractical or prohibitively expensive to install them. An important consideration of the purchase and installation of an air conditioning unit is the cost of operating the unit. An inefficiently operated air conditioner can result in substantial energy costs.

Remote control units for control of air conditioners have been developed successfully. Not only does a remote control provide the operator with freedom of movement while controlling the room air conditioner, but further gives easy access to the controls. Specifically, prior controls for a room air conditioner unit were normally placed on the surface of the unit, while the unit was placed at a high, low, or awkward position in the room. A remote control unit, therefore, does not require the operator to reach up or bend down to operate the unit. Further, remote controls do not require space on the surface of the air conditioner.

A problem in air conditioner operation is controlling different modes of operation in a diagnostic or production line basis. For example, during assembly prior to packaging for transport it is advisable to test the unit to assure it fulfills all design specifications. Prior art testing methods needed physical contact with the unit to cycle through a number of diagnostic test procedures or modes to ensure the air conditioner was properly constructed.

Presently there is a need to test the infrared link or other communication link to a newly manufactured room air conditioner. There exists a need for selective non-contact control of a product during assembly and test procedures within a factory.

Remote control of room air conditioners is disclosed in U.S. Pat. No. 5,113,665. This remote control unit is utilized for operating a test run of the air conditioner. A wireless remote controller utilizes a microprocessor for transmitting operating data to an air conditioner and a receiving circuit for receiving back data on air conditioner operation. Only a single remote is disclosed that operates in a test mode.

Other room environmental units such as ceiling fans as disclosed in U.S. Pat. No. 5,189,412 which include a diagnostic mode of operation. As further known in the art, other systems may utilize remote analyzers or built-in diagnostic modes via control jumpers as shown in U.S. Pat. Nos. 4,146,085 and 4,470,266, respectively.

The present invention is directed to overcome the aforementioned problems associated with remote control room air conditioners, where it is desired to provide a user friendly interface for selection of diagnostic test modes in both production and domestic environments.

SUMMARY OF THE INVENTION

The present invention provides an electronic control for a room air conditioner including a first remote control unit to control the operation of the room air conditioner and a second remote control unit utilized for diagnostic and data acquisition purposes. The remote control system permits a consumer to operate the room air conditioner in various normal operation modes while a service person utilizes a second remote control unit to set various parameters for diagnostic modes that may be different from normal operation modes.

Additionally, during room air condition assembly, the unit may also be run through a selection of diagnostic tests without physical contact to the room air conditioner.

The present invention provides an infrared link mechanism to allow authorized personnel to enter routines that may be physically damaging to a product under certain conditions. Additionally, by use of an infrared link, control may be guarded to prevent other test modes of the system to be utilized. The diagnostics entered into the second remote control unit utilizes either a unique identifier or a common identified and a unique command not available on the first remote control unit utilized by the consumer. In the case of factory testing the remote control may issue a sequence of messages that may be unique to the diagnostic remote or common to the consumer remote at appropriate times to cause the unit to execute a specific sequence of air conditioner operation to allow monitoring of the functions of the air conditioner and its components.

Another feature of the second remote control unit is that if a correct code is sent to enter a diagnostic mode a plurality of different test may be conducted on the room air conditioner. Tests of standard conditions, speed tests to verify action of the on/off delay timer or a reset function to force a power-on reset are possible. Other tests contemplated utilize a thermistor test to thereby display the temperature on the room air conditioner or a 60 times speed up cycle to permit testing of particular cycle times irrespective of the cycle normally set within the room air conditioner.

Accordingly, one advantage of the present invention is that the remote control unit allows a user to set various diagnostic operating parameters of the room air conditioner that may be different from consumer operation modes. This provides a service person friendly interface to allow flexible selection of current or delayed testing operations of the room air conditioner. Still another advantage of the present invention is the ease of use of the remote with its inherent flexibility and versatility.

Another advantage of the present invention is that testing on the factory floor during production of the room air conditioners becomes less invasive to the air conditioner itself. The selective non contact control of the air conditioner increases the quality of the entire production run of air conditioners.

The invention, in one form thereof, provides an electronic control for use in operating a room air conditioner in a particular diagnostic test mode. The remote control unit is adapted to be located remote from the room air conditioner and a room air conditioner control unit. The remote control unit includes an input means for selecting the operation parameters of a particular diagnostic test mode of the room air conditioner and for generating selection signals. A process means is included for processing the selection signals into a plurality of output signals, the output signals including an encoded sequence corresponding to the particular diagnostic test selected. Memory means are operably associated with the processor means for maintaining in memory the selection signals. Wireless communication means are utilized for sending the output signals to the room air conditioner control unit. The room air conditioner control unit includes a second wireless communication means for receiving the output signals and switch means for controlling the room air conditioner in the particular diagnostic test mode selected. The switch means is operably connected to the second wireless communication means.

The invention in another form provides the input means with a plurality of keys. The keys enable the processor means to load selection signals into the memory means. The keys further enable and disable the particular diagnostic test mode selected.

The invention, in yet another form, provides an electronic control system for a room air conditioner comprising a first remote control unit and a second remote control unit both adapted to be separately located remote from the room air conditioner. Each remote control unit includes an input means for selecting the operation parameters of the room air conditioner and for generating selection signals. The second remote control unit input means is adapted to select operation parameters of particular diagnostic modes for the room air conditioner. Each remote unit includes a processor for processing the selection signals into a plurality of output signals, the output signals including an encoded sequence corresponding to the desired operating parameters of the room air conditioner. The second remote control unit output signals additionally include an encoded sequence corresponding to the particular diagnostic test mode selected. Memory means for maintaining in memory the selection signals are operably associated with the processor means. Each remote control unit includes a primary wireless communication means for sending the output signals. A room air conditioner control unit includes a secondary wireless communication means for receiving the output signals from either of the primary wireless communication means. Switch means controlling the room air conditioner in a particular diagnostic test mode or in correlation with the operational parameters selected is included with the switch means being operatively connected to the secondary wireless communication means.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
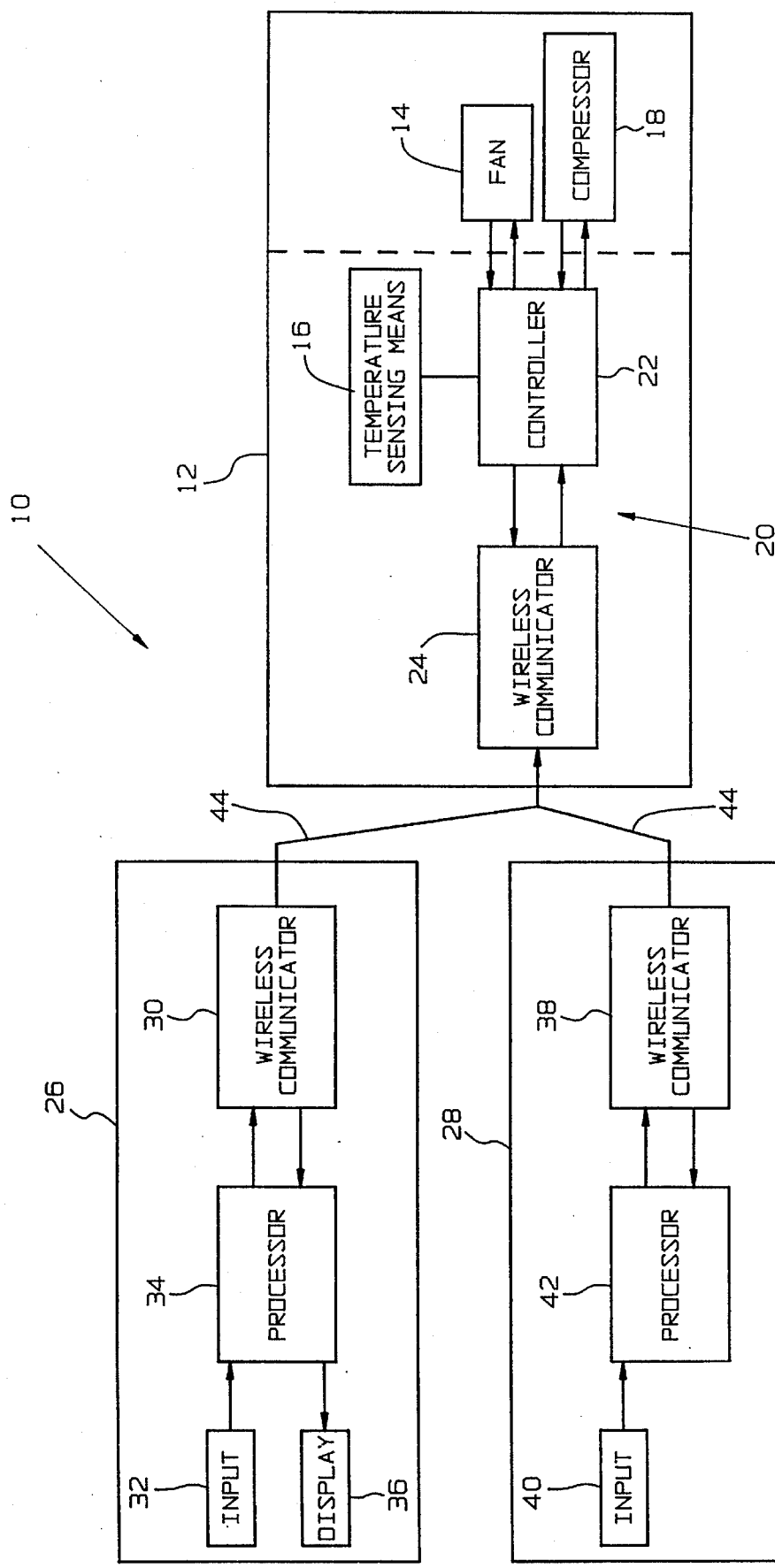
FIG. 1 is a block diagram of the remote control unit and room air conditioner of the present invention.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Referring now to the drawings and particularly to FIG. 1, there is shown a block diagram of one embodiment of the remote control system 10 with a room air conditioner 12 according to the present invention. In this embodiment, room air conditioner 12 includes a fan 14, and a compressor 18. Located within the air conditioner 12 is an appliance control unit 20 which includes controller means 22 operatively connected to fan 14 and compressor 18 to control the room air conditioner 12, and more particularly, to energize, control the power levels, and de-energize fan 14 and compressor 18. A temperature sensing means 16 is operatively connected to the controller means 22. A secondary wireless communication means 24 is operatively connected to switch means 22.

In this embodiment, remote control system 10 utilizes two separate remote control units 26 and 28. The first remote control unit 26 communicates via a primary wireless communication means 30 with appliance control 20 adapted to be located remote from room air conditioner 12. An input means 32, such as a keypad is operatively connected to a processor 34 and in turn is connected to wireless communication means 30. Display means 36 is additionally connected to processor 34 so that the operational status of processor 34 may be viewed. It will be appreciated that various types of wireless communication between remote control unit 26 and appliance control unit 20 may be employed. Preferably infrared communication means are utilized. However, ultrasonic or radio frequency communication means may also be utilized for signal transmission.

Second remote control unit 28, (the diagnostic control unit) is similar to first remote control unit 26 in that it also includes a wireless communication means 38 to communicate with appliance control unit 20. An input means 40 is operably connected to a processor 42 that in turn is connected with primary wireless communication means 38. Primary wireless communication means 38 preferably utilizes an infrared means for communication with secondary wireless means 24.

Input means 32 and 40 of the remote control units 26 and 28 may include selection means such as touch keys or switches for selecting operational parameters of the room air conditioner including power levels for fan 16, the unit cooling temperature and for generating corresponding selection signals for each of any number of particular operational parameters.

Input means 40 may comprise a similar membrane keyboard or keypad through which diagnostic tests may be selected for room air conditioner 12.

Referring again to the block diagram of FIG. 1, remote control units 26 and 28 include input selection means 32 and 40 for selecting the operational or diagnostic parameters of room air conditioner 12 and for generating selection signals. Selections received by input means 32 or 40 are provided to processor 34 or 42 respectively, which in turn, processes such selections into a plurality of output signals 44. Output signals may comprise a start signal, a signal identifying the manufacturer of the remote control system 10 and a signal identifying the model of remote control units 26 or 28. Output signals 44, may also include a signal identifying the mode of remote control units 26 and 28, wherein remote control unit 26 may be set to command a change in the output of room air conditioner 12 or program or diagnostic mode commands and parameters, such as discussed hereinbelow. Furthermore, the remote output signal 44 may include a signal representing the desired fan speed mode of operation. It will be appreciated that the actual codes or bit patterns used to represent the data transmitted by remote control units 26 and 28 are a matter of design choice.

Output signals 44 are collected and then transmitted by the secondary wireless communication means 24 to controller 22 of appliance control unit 20. Operatively connected to controller means 22 are fan 14 and compressor 18. Controller means 22 switches, i.e., activates and deactivates, compressor 18 and fan 14 based on output signals 44 received from remote control units 26 and 28 and from temperature readings from temperature sensing means 16.

The present invention includes the ability to set diagnostic program and parameters of operation in the room air conditioner 12. The diagnostic procedures are designed to change observable qualities of room air conditioner 12. If the previously designated observable change of room air conditioner was not observed then the air conditioner is concluded to have failed the diagnostic test.

Particular tests adaptable to the present system include but are not limited to: operating room air conditioner 12 under a particular set of conditions (i.e. selected times and temperatures); a speed test to accelerate any times in the room air conditioner system to ensure such timers operate within specifications; a test of the dry cycle, which intermittently controls the compressor and fan to reduce humidity in the room; a load test in which all or a majority of room air conditioner 12 systems are activated to monitor current draw; thermistor tests; and a power on reset function.

In general the diagnostic remote control unit could be constructed using a standard remote control integrated circuit or a microcomputer programmed to produce the selected appropriate codes.

Figure 2:
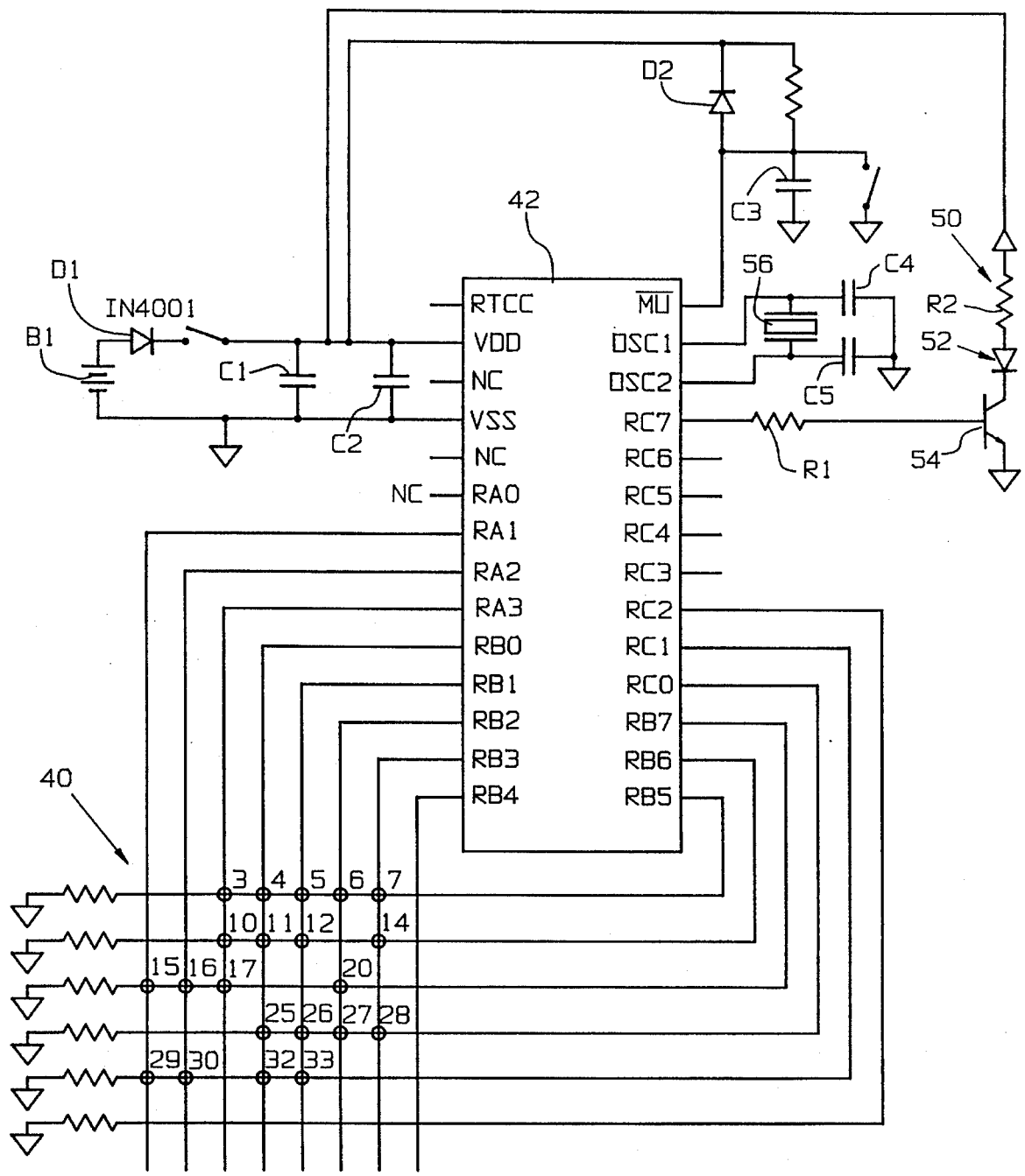
FIG. 2 is a schematic diagram of one embodiment of the room air conditioner control unit of the present invention.

Referring now to FIG. 2, there is shown a partial schematic diagram of one embodiment of the remote control unit of the present invention. Microprocessor 42 such as the PIC16C57 manufactured by Microchip Inc., is operatively connected to keyboard 40 for acceptance of user selected operational parameters. A transmitter means such as transmitter branch circuit 50 for sending signals to appliance control unit 20 from remote control unit 28 is also operatively connected to microprocessor 42. Such a transmitter is simply an infrared LED 52 diode buffered with a transistor 54. Infrared transmitting LED diode should have a wide transmission pattern as the distance between remote control unit 28 and appliance control unit 20 may vary. A pulse-modulated carrier frequency, such as that generated by microprocessor 42 when clocked by a frequency generated by ceramic resonator 56, of 4.00 MHz, is sufficient to drive infrared transmitter 52.

The following table shows representative values for the corresponding parts labeled in FIG. 2:

| 42 | Microcomputer | PIC16C57XT/P |
|---|---|---|
| 52 | Infrared LED | LN64PA |
| 54 | Transistor | 2N6724 |
| 56 | Ceramic Resonator | 4.00 MHZ |

-continued

| D1–D2 | Diode | IN4001 |
|---|---|---|
| C1 | Electrolytic Capacitor | 100 UF, 10 V |
| C2 | Ceramic Capacitor | .01 UF, 50 V |
| C3–C5 | Ceramic Capacitor | 20 pF, 50 V |
| R1 | Resistor | 250 ohms |
| R2 | Resistor | 2 ohm |
| B1 | Battery | 4-1.5 V Cells |
| 40 | Keypad | 21 - P8037S |

In one embodiment of the present invention, on depression of a key on remote control unit 28 as shown in FIG. 1, one of a plurality of diagnostic output signals 44 are transmitted in a single burst of intermittent infrared light pulses to appliance control unit 20. The intermittent pulses of light enable the encoding of the diagnostic output signal 44 to be transmitted. The light is transmitted with a carrier frequency of 38 KHz with a one third duty cycle. This one third duty cycle is particularly important in view of the fact that remote control unit 10 is powered by batteries (see FIG. 2), and therefore, battery life is extended with a one third duty cycle, intermittent pulses of light for encoding, and a single burst of light pulses.

Figure 3:
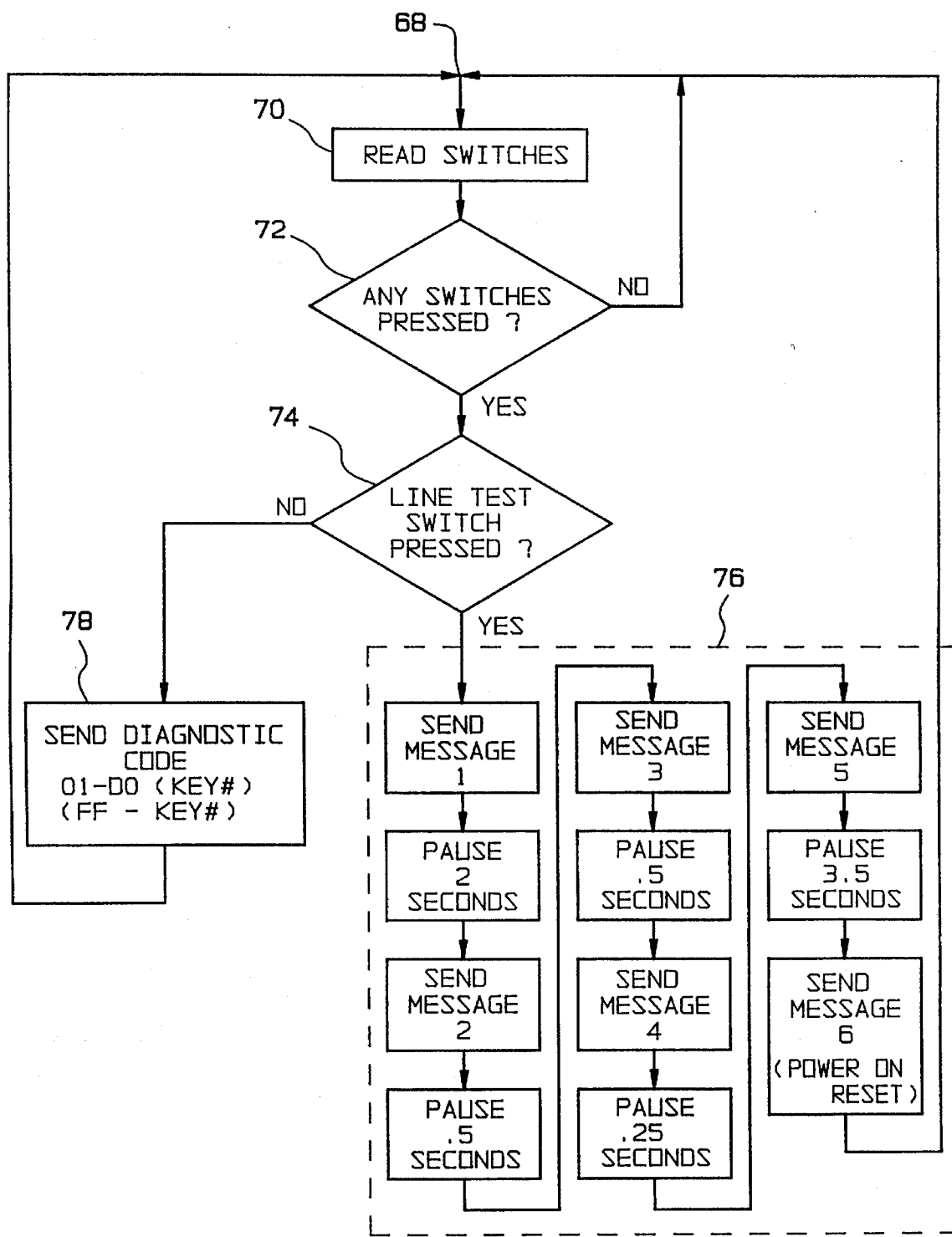
FIG. 3 is a flow chart of one embodiment of the processing method of the diagnostic remote control unit.

Referring now to FIG. 3, the microcomputer reads keypad 40 by strobing output lines and monitoring input lines until a switch is indicated as closed as is known in the art (flow chart blocks 70 and 72). When a switch closure is determined to have occurred, the microcomputer determines if the switch closed was the LINE TEST SWITCH (decision block 74). If the LINE TEST SWITCH was closed, the microcomputer sends a series of precomposed messages (block 76) to the appliance control unit 20 via the infrared link. The messages are interspersed with appropriate times to allow automatic or manual checking of the functions of the air conditioner. The messages are composed of a start bit, an identifier, a series of status bits and/or commands, and a checksum. The final message causes a power on reset of the air conditioner, restoring the unit to an initialization state. If the LINE TEST SWITCH was not depressed, the switch depressed is mapped to one of a series of messages represented by key numbers (flow chart block 78). A message is then composed and sent consisting of a start bit, an identified, a key number represented as an 8 bit number and a checksum calculated by subtracting the 8 bit number from the hexadecimal number "FF". That message will cause a routine in the appliance control unit 20 to execute some predetermined diagnostic routine. Example diagnostic routines include: Power on reset with memory clear, Dry cycle at 60 times speed, a program test, a 60 times speed on to shorten delays associated with the compressor start up, and a load test.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electronic control for use in operating a room air conditioner in a particular diagnostic test mode, said electronic control comprising:

a remote control unit adapted to be located remote from said room air conditioner, said remote control unit including:

input means for selecting the operational parameters of the particular diagnostic test mode of said room air conditioner and for generating selection signals;

processing means for processing said selection signals into a plurality of output signals, said output signals including an encoded sequence corresponding to the particular diagnostic test selected said room air conditioner operating according to said encoded sequence;

memory means for maintaining in memory said selection signals are operably associated with said processor means; and first wireless communication means for sending said output signals; and a room air conditioner control unit including
a second wireless communication means for receiving said output signals, and
switch means for controlling said room air conditioner in the particular diagnostic test mode selected, said switch means operatively connected to said second wireless communication means.

2. The electronic control of claim 1 wherein said first and said second wireless communication means respectively send and receive said output signal via an intermittent infrared beam.

3. The electronic control of claim 1 wherein said input means includes a plurality of keys, said keys enabling said processor means to load said selection signals into said memory means, said keys further enabling and disabling the particular diagnostic test mode selected.

4. The electronic control of claim 1 wherein said input means includes a plurality of keys, said keys enabling said processor means to load said selection signals into said memory means, said keys further enabling and disabling a plurality of diagnostic test modes in said room air conditioner control unit.

5. The electronic control of claim 1 wherein said processing means prevents two different diagnostic test mode selection sequences from being loaded into said memory means.

6. The electronic control of claim 1 wherein said processing processes selection signals to create an output signal to force a power on reset of said room air conditioner control unit and leave a diagnostic test mode.

7. An electronic control system for a room air conditioner, said electronic control system comprising:

a first remote control unit and a second remote control unit both adapted to be separately located remote from said room air conditioner, said each remote control unit including:

input means for selecting the operational parameters of said room air conditioner and for generating selection signals, said second remote control unit input means adapted to select operational parameters of particular diagnostic test modes for said room air conditioner;

processor for processing said selection signals into a plurality of output signals, said output signals including an encoded sequence corresponding to the desired operating parameters of said room air conditioner, said second remote control unit output signals additionally including an encoded sequence corresponding to the particular diagnostic test selected said room air conditioner operating according to said encoded sequence;

memory means for maintaining in memory said selection signals are operably associated with said processor means; and a primary wireless communication means for sending said output signals; and a room air conditioner control unit including
a secondary wireless communication means for receiving said output signals, and
switch means for controlling said room air conditioner in the particular diagnostic test mode and corresponding to the operational parameters selected, said switch means operatively connected to said secondary wireless communication means.

8. The remote control system of claim 7 wherein said processor within said secondary remote control unit prevents two diagnostic modes from operating at the same time.

9. The remote control system of claim 7 wherein said input means further includes a key to select a diagnostic test mode for the room air conditioner having a dry cycle which speeds up the dry cycle to permit a rapid check of the cycle regardless of time delays within an operational dry cycle.

\* \* \* \* \*